Nov. 18, 1969 — F. MARTI — 3,478,509

BEARING FOR WATCH PIVOT

Filed Feb. 12, 1968 — 2 Sheets-Sheet 1

INVENTOR.
FRITZ MARTI

BY Curtis, Morris & Safford
ATTORNEYS

Nov. 18, 1969　　　　　F. MARTI　　　　　3,478,509
BEARING FOR WATCH PIVOT
Filed Feb. 12, 1968　　　　　　　　　　2 Sheets-Sheet 2

INVENTOR.
FRITZ MARTI

BY
*Curtis, Morris Safford*
ATTORNEYS

United States Patent Office 3,478,509
Patented Nov. 18, 1969

3,478,509
BEARING FOR WATCH PIVOT
Fritz Marti, La Chaux-de-Fonds, Switzerland, assignor to Portescap, Le Porte-Echappement Universel S.A., La Chaux-de-Fonds, Switzerland
Filed Feb. 12, 1968, Ser. No. 704,826
Claims priority, application Switzerland, Feb. 16, 1967, 2,406/67
Int. Cl. G04b 31/00
U.S. Cl. 58—140
8 Claims

ABSTRACT OF THE DISCLOSURE

A watch bearing having a hole jewel and an end-piece which is held adjacent to the back of the hole jewel. The end-piece does not completely cover the back of the hole jewel allowing the bearing to be lubricated without removal or dismantlement.

---

The present invention relates to bearings for watch pivots, whether shock-dampening or not, which are composed of a hole jewel and an end-piece. Bearings of this type generally comprise a hole jewel, the upper surface of which, adjacent to the end-piece, is convex and an end-piece having a diameter equal to or greater than the diameter of the hole jewel, facing the hole jewel, and located at a slight distance from it (a few hundredths of a millimeter).

In order to oil these bearings, whether they are removable or not, a drop of oil is introduced from below (as viewed by the person introducing the oil) into the hole of the hole jewel. When introduced, the drop of oil passes through the hole and spreads out by capillary action in the area between the hole jewel and the end-piece. This bearing construction and oiling procedure, however, does not permit watch movements to be cleaned without removing the bearings and, in particular, does not permit watch bearings, particularly those intended for use as bearings for a balance staff, to be relubricated without removing them.

The present invention relates specifically to affording the possibility of cleaning and relubricating watch bearings without removing the bearings, thus simplifying repair operations. Its object is to provide a bearing for a watch pivot which comprises a hole jewel and an end-piece, characterized by the fact that the end-piece is smaller than the hole jewel and is held by a support at a short distance from the adjacent surface of the hole jewel in such a manner as to make said surface accessible to the oil from above (as viewed by a person introducing the oil), thus making it possible to clean and oil the bearing without removing it.

The accompanying drawings show examples of several embodiments of the bearing which form the subject matter of this invention.

FIGURE 3 is an axial section through another embodiment, of which

Figure 1:
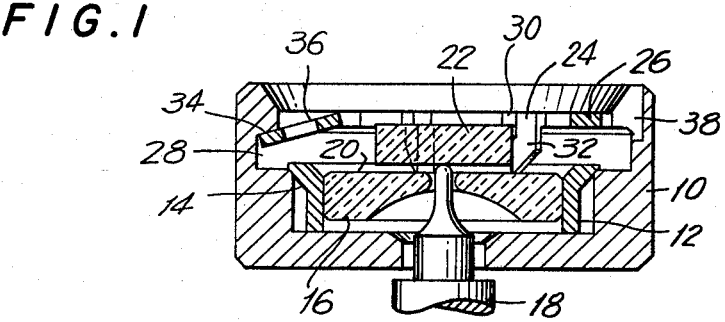
FIGURE 1 is an axial section through one of the embodiments.
Figure 2:
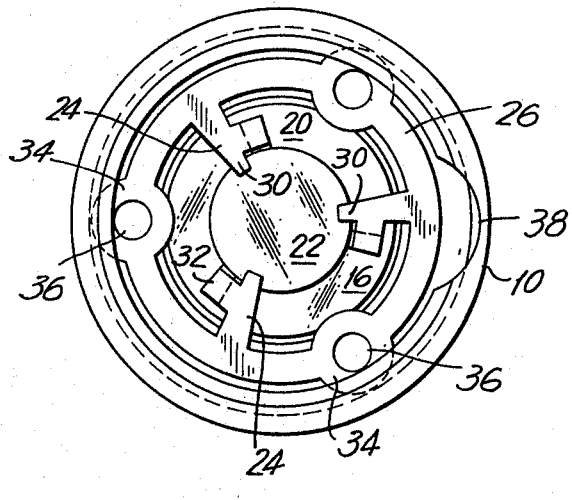
FIGURE 2 is a plan view of the bearing of FIGURE 1.

The bearing of FIGURES 1 and 2 is a shock-dampening bearing for a rotating end of a balance staff, or shaft.

The bearing consists of a bearing body 10 in which there freely rests on a conical surface a mount 12 having a conical upper portion 14 in which there is fitted, as by crimping a hole jewel 16.

In use, the swinging of the hole jewel 16 with its mount 12 having conical upper portion 14, makes it possible in a known manner to take up the radial impacts which a shaft may experience, for instance, a radial impact transmitted by the end of a balance staff 18 (see FIGURE 1).

The upper surface 20 of the hole jewel is flat.

An end-piece 22 whose diameter is about half that of the hole jewel is mounted axially between the claws 24 of an annular spring 26 which is elastically held in a groove 28 of the bearing body. The end-piece 22 does not rest directly on the flat surface 20 of the hole jewel but is held elastically at a slight uniform distance away from said surface by the claws 24 of the elastic support 26.

The claws 24 are three in number and are arranged symmetrically 120° from each other with respect to the axis of the bearing and each have a point 30 which rests on the upper surface of the end-piece and a lateral branch 32 which is bent vertically and which rests on the edge of the end-piece. The tip of the lateral branch 32 extends beyond the lower surface of the end-piece and rests on the flat upper surface 20 of the hole jewel.

The annular spring 26 has three peripheral protrusions 34 provided with holes 36 which make it possible to turn it with a suitable wrench in order to introduce it into the groove 28 of the bearing body and center it therein. A notch 38 is provided in the upper edge of the body of the bearing 10 making it possible to introduce the spring 26 into the groove 28 without deforming it.

The spring 26 serves multiple functions. The tips of the vertical arms 32 of the claws 24 of spring 26 rest on the hole jewel and dampen the axial impacts which the hole jewel may experience. They also contribute towards recentering the hole jewel after a radial impact. The ring, with its claws 24, maintains the end-piece at a desired uniform distance from the hole jewel to permit a drop of oil to stay in the central zone of the bearing and also to absorb the axial impacts of the shaft end. The vertical arms 32 of the claws 24 further serve as a guide for the drop of oil when the latter is introduced from above into the bearing without taking it apart. The tips of the vertical arms 32 of the claws 24 also contribute capillary attraction to keep the drop of oil at the center of the bearing; the drop of oil tends to occupy a triangular surface of which the claw tips form the apices.

Figure 3:
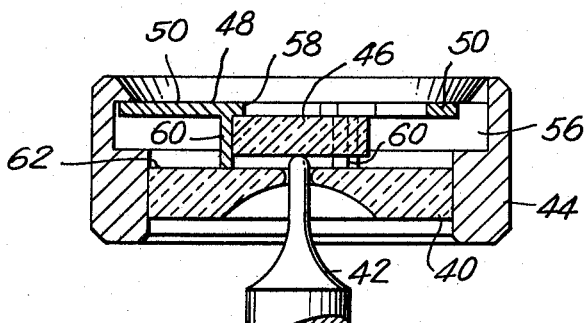
Figure 4:
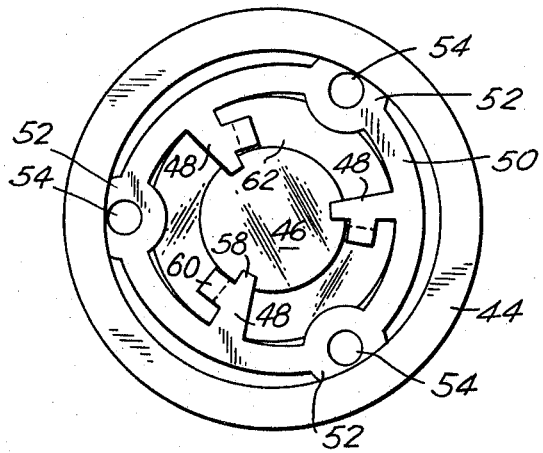
FIGURE 4 is a plan view.

The bearing of FIGURES 3 and 4 is an ordinary bearing for a trumpet shaft. A hole jewel 40, in which a shaft end 42 turns, is pressed into the body of the bearing 44 with a force fit. An end-piece 46 which is half the size of the hole jewel is held by three symmetrical claws 48 at the center of an annular support 50 which may be elastic or rigid and which is held by three peripheral protrusions 52 provided with operating holes 54 in a groove 56 of the bearing body 44.

The claws 48 are similar to those of the first embodiment; they also have ends 58 which rest on the end-piece and lateral arms 60 bent vertically which rest against the end of the end-piece. The tips of the lateral arms 60 exceed the lower surface of the end-piece and rest on the flat upper surface 62 of the hole jewel to assure the necessary spacing between the two jewels, thus providing for the limited spreading out of a drop of oil.

The annular support 50 is not precisely circular; its peripheral annular portion approaches the shape of a triangle. The support is maintained in the groove 56 of the bearing body by only its three radial protrusions 52.

Figure 5:
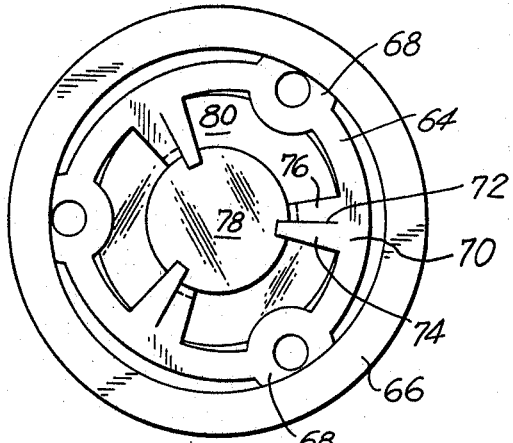
FIGURE 5 is a plan view of a variant in detail.

In the variant of the elastic or rigid support shown in FIGURE 5, the shape of the peripheral annular portion 64 also approaches that of a triangle and is also maintained in the groove of the bearing body 66 by only the radial protrusions 68. Only the shape of the claws 70 has been changed. Here the claws 70 have a radial slot 72 which divides them into two arms 74 and 76. One of these arms, 74, rests at its end on the upper surface of the end-piece 78, while the other arm, 76, is bent vertically and rests radially against the edge of the end-piece, its tip protruding beyond the lower surface of the latter and maintaining the end-piece at a desired distance from the flat surface 80 of the hole jewel.

Figure 6:
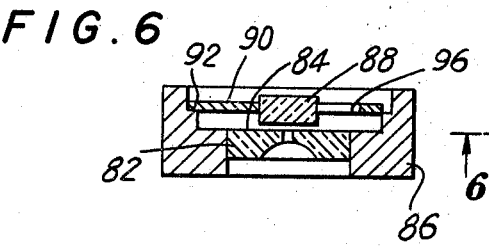
FIGURES 6 and 7 are views in an axial section and in a plan view, respectively, of still another embodiment. The axial section shown in FIGURE 6 is a right angle section taken along the section lines of FIGURE 7 and is shown in FIGURE 6 with one side rotated 90° for purposes of illustration.
Figure 7:
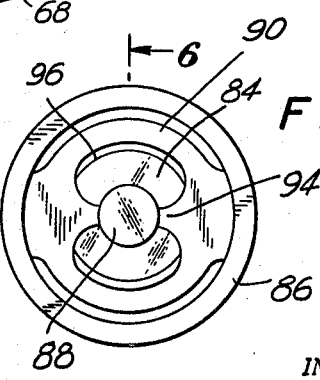

The embodiment of FIGURES 6 and 7 is a bearing of a non-dismountable type known as a combined in-setting. This bearing comprises a hole jewel 82 with a flat upper surface 84 press-fitted in the in-setting 86, and an end-piece 88, smaller than the hole jewel, maintained at the desired distance from the upper surface 84 by a rigid support 90 press-fitted in the in-setting 86. The rigid support 90 rests on an inner shoulder 92 of the in-setting. The annular rigid support 90 holds the end-piece 88 by two diametrically opposite claws 94 in which the end-piece is crimped. The support 90, which may advantageously be made of steel or nickel, has, on each side of the end-piece between the claws 94, an opening 96 which uncovers a limited zone of the upper surface 84 of the hole jewel 82. This makes it possible, as in the other embodiments, to introduce a drop of oil from above without removing the in-setting from the movement.

The invention has been described hereinabove, in preferred embodiments, but it is to be understood that the invention is in no way confined to the particular forms, uses or sizes shown and described and that numerous modifications or alterations may be made therein without departing from the spirit of the invention.

What is claimed is:

1. A bearing for a time-piece comprising, in combination, a bearing body, a hole jewel supported within said bearing body, said hole-jewel having a front and back, said front being adapted to cooperate with the end of a shaft, an end-piece having at least one radial dimension smaller than said hole jewel, and a support engaging said bearing body and said end-piece for positioning said end piece adjacent the back of said hole jewel in spaced relationship thereto to provide an open space therebetween to receive lubricant, and said end-piece having the smaller radial dimension defining a passageway to the back of said hole jewel, whereby lubricant can be introduced onto said exposed back portion of said hole jewel and be drawn by capillary action into said open space between said end-piece and said hole jewel.

2. A bearing for a time-piece as described in claim 1, wherein said hole jewel and said end-piece are disc-shaped and have circular outer edges.

3. A bearing for a time-piece as described in claim 2 wherein said support has a plurality of radial claws and wherein said passageway is further defined between said radial claws.

4. A bearing for a time-piece as described in claim 3 wherein said support is a metal ring, said plurality of radial claws extend inwardly toward the center from said ring and wherein each said claw has an arm with at least two portions, one said portion being adapted to rest on the back of said hole-jewel and the other being adapted to engage said end-piece.

5. A bearing for a time-piece as described in claim 4 wherein said ring has elastic properties.

6. A bearing for a time-piece as described in claim 5 wherein the back of said hole jewel is flat.

7. A bearing for a time-piece as described in claim 6 wherein a mount having at least one conical outer surface is provided in said bearing body for said hole jewel and wherein said bearing body has at least one circular surface adapted to receive said conical outer surface of said mount, said hole jewel being affixed in said mount, and said mount being fitted within said bearing body so that said conical surface of said mount rests on said circular surface of said bearing body, whereby said hole jewel is mounted to swing in said bearing body.

8. A bearing for a time-piece comprising, in combination, a bearing body, for a hole jewel supported in a mount within said bearing body, said mount having at least one conical outer surface, said bearing body having at least one circular surface adapted to cooperate with said conical outer surface of said mount, said hole jewel having a front and back, said front being adapted to cooperate with the end of a shaft, a circular end-piece of smaller diameter than said hole jewel, and a support affixed to said bearing body having claws engaging said end-piece for supporting said end-piece adjacent the back of said hole jewel in spaced relationship thereto, said end-piece and said hole-jewel defining a space therebetween adapted to receive lubricant, and said end-piece and said support defining passageways between said claws exposing portions of the back of said hole jewel, whereby lubricant, can be introduced through said passageways onto said exposed back portions of said hole jewel and be drawn by capillary action into said space between said end-piece and said hole jewel.

References Cited

UNITED STATES PATENTS

| 2,671,309 | 3/1954 | Marti et al. | 58—140 |
| 2,720,077 | 10/1955 | Stein | 58—140 |
| 2,886,943 | 5/1959 | Huguenin | 58—140 |
| 2,973,618 | 3/1961 | Morf | 58—140 |

FOREIGN PATENTS

| 1,049,614 | 8/1953 | France. |
| 353,685 | 5/1961 | Switzerland. |

RICHARD B. WILKINSON, Primary Examiner

S. A. WAL, Assistant Examiner